UNITED STATES PATENT OFFICE.

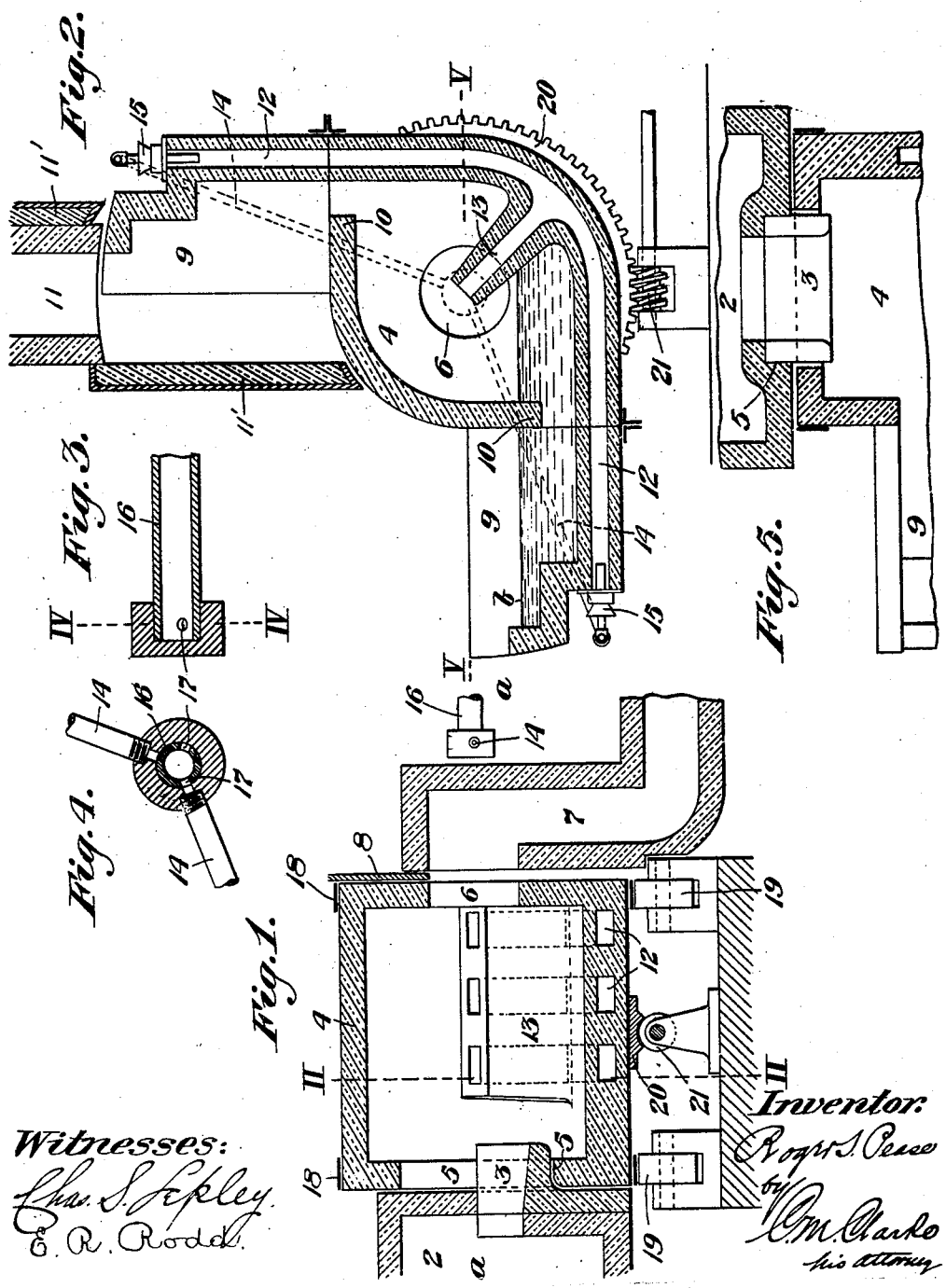

ROGER S. PEASE, OF ALLEGHENY, PENNSYLVANIA, ASSIGNOR TO ALFRED M. LEE, TRUSTEE, OF PITTSBURG, PENNSYLVANIA.

APPARATUS FOR DELIVERING MOLTEN GLASS.

No. 870,250.          Specification of Letters Patent.          Patented Nov. 5, 1907.

Application filed January 15, 1907. Serial No. 352,389.

*To all whom it may concern:*

Be it known that I, ROGER S. PEASE, a citizen of the United States, residing at Allegheny, in the county of Allegheny and State of Pennsylvania, have invented certain new and useful Improvements in Apparatus for Delivering Molten Glass, of which the following is a specification, reference being had therein to the accompanying drawing.

My invention refers to improvements in apparatus for the manufacture of glass articles, and consists of a movable vessel arranged to receive and deliver quantities of molten glass and provided with means for maintaining the charge in a heated condition.

The invention is designed for continuous operation and to continuously deliver any desired quantity of glass for removal from the vessel, either by the operation of drawing directly therefrom or by pouring into molds, pots, or upon a table for rolling, and is particularly designed to obviate the difficulties or necessity of the usual ladling or other manipulating operations.

It constitutes an improvement in that class of apparatus shown and described in my prior application filed June 20, 1906 bearing the Ser. No. 322,502.

In the drawings, Figure 1. is a central longitudinal vertical section through a portion of a glass melting tank, the movable delivering vessel, and portions of the outlet flues. Fig. 2. is a vertical sectional view on the line II. II. of Fig. 1. Figs. 3 and 4 are detail sectional views of the connecting joint for the fuel supply pipes. Fig. 5. is a partial horizontal sectional view on the line V. V. of Fig. 2.

Referring to the drawings, 2 represents a tank of any suitable construction in which the molten glass is melted and contained, provided with a delivery spout 3, preferably made separate so as to be renewed from time to time.

4 is the delivering vessel, generally cylindrical in form and provided with an opening 5 at one end surrounding the spout 3 whereby glass may be delivered to the interior of the vessel 4 at varying positions thereof. Vessel 4 is also provided with an opening or port 6 at the other end communicating with an outlet flue 7 leading to a stack or other conduit, and communication may be cut off or controlled by an intervening damper 8.

Extending transversely of the axial center $a$, $a$, of the vessel and forming continuations thereof, generally arranged in directions at right angles to each other, are the chambers 9, 9, which like spout 3, are preferably made separable from the vessel body in order to allow of renewal or re-lining as worn. A bridge wall 10 preferably divides the main central cavity of vessel 4 from the chamber 9 at each side, so arranged as to project downwardly considerably below the normal level $b$ of the glass, so that as it flows outwardly into chamber 9 when the vessel is tipped to one side or the other, it will be strained from any bubbles or other lighter impurities, thus presenting a solid mass of pure clean glass.

11 is a flue suspended above the vessel 4 and arranged centrally thereof, with which the open top of each chamber 9 will make communicating engagement alternately as shown at the right side of Fig. 2, the open side being closed by a door or damper 11', the other damper 11' being raised as shown.

The construction of the movable vessel and its extensions is such that its movement is not limited by making abutting contact against the flue, but the extension chamber 9 may swing under it more or less, thereby allowing of tipping the vessel sufficiently to pour from the other extension upon a table or into a receiving pot or mold.

Ordinarily the circulation of the gases from the tank furnace passing outwardly through opening 5 and through the interior of vessel 4 will keep the glass hot, but for the purpose of adding supplemental heat I have provided a series of fuel ports 12 leading through the lower walls of the chambers 9 at each side and to the interior of the vessel 4 through a hollow pier 13, providing for interior combustion to any degree desired. Gas and air are supplied by pipe 14 and mixers 15 which introduce the fuel into the ports 12 running underneath the chamber 9 at each side, and as the combustion occurs in ports 12, the bottoms of chambers 9 will be kept hot, insuring a uniform consistency of the glass.

Any suitable gas connections may be maintained from a source of supply to the mixers 15, as by flexible tubes, but a convenient and automatic arrangement is shown in the drawings by employing a main header pipe 16 having ports 17 adapted to make registering communication with one or the other of pipes 14 according to which chamber is in the lowered position, the other pipe being cut off, as clearly shown in Figs. 3 and 4.

The vessel 4 may be made of fire brick, clay, or any refractory material and surrounded by sheet metal as will be readily understood, being properly reinforced in any convenient manner as by strengthening bands 18.

The vessel is mounted upon any suitable rolling supports as a plurality of wheels or rollers 19 adapted to bear upon the metal bands 18 thus securely supporting the entire apparatus and positively centralizing it with relation to the charging spout 3 and flue 7.

Any suitable means may be employed for tilting the vessel, as a worm segment 20 and worm 21 operated by hand or machinery.

The operation of the invention will be readily understood from the foregoing description. Glass may be charged into the interior of the vessel from time to time by spout 3 which is always in register, whether the vessel is stationary or being tilted, and upon tilting it over a quarter turn to one side or the other the glass will flow outwardly into one or the other chamber 9, the un-used chamber making communicating connection with the flue 10. By this means the circulation of the gases will maintain the contained glass at the desired temperature, supplemented by the heat of flues 12 and 13, and the glass in chamber 9 will always be in condition for working. The glass may be drawn directly from said chamber as in mechanical drawing, or by tipping the vessel beyond the horizontal, the glass may be poured, and the pouring operation may continue indefinitely if desired, since any desired quantity of glass may be charged into the tipping vessel from the tank at all positions.

It will be understood that the apparatus may be made in any capacity, size or design; it may be provided with either a single chamber 9 at one side only if preferred, and may be otherwise changed or varied by the skilled mechanic, but all such changes are to be considered as within the scope of the following claims.

What I claim is:

1. A tipping glass-holding vessel having a drawing chamber, and fuel passages leading through its walls underneath the interior cavity, substantially as described.

2. A tipping glass-holding vessel having a drawing chamber and fuel passages leading through its walls underneath the interior cavity, and opening into the interior of the vessel, substantially as described.

3. A tipping glass holding vessel having a fuel-supply port incorporated in its wall, and an inwardly projecting hollow pier communicating with said port, substantially as set forth.

4. A tipping glass-holding vessel having a drawing chamber, and fuel passages leading through its walls underneath the interior cavity, and opening into the interior of the vessel, and provided with means for supplying fuel to said passages, substantially as described.

5. A rotatable glass holding vessel provided with a receiving opening and a laterally extending drawing chamber, and means incorporated with the vessel for heating its walls, substantially as set forth.

6. A rotatable glass holding vessel provided with a receiving opening and a laterally extending drawing chamber, and having fuel passages leading through its walls, substantially as set forth.

7. A rotatable glass holding vessel provided with a receiving opening and a laterally extending drawing chamber, and having fuel passages leading through its walls and to its interior, substantially as set forth.

8. A rotatable glass holding vessel provided with a receiving opening and a laterally extending drawing chamber, and having fuel passages leading through its walls, with means arranged to furnish a fuel supply to said passages at varying positions of the vessel, substantially as set forth.

9. A rotatable glass holding vessel provided with a laterally extending drawing chamber and having a fuel conduit leading through its wall and into the interior of the vessel, substantially as set forth.

10. A rotatable glass holding vessel provided with a laterally extending drawing chamber and having a fuel conduit leading through its wall and into the interior of the vessel, with means for supplying fuel to said conduit at varying positions of the vessel, substantially as set forth.

In testimony whereof I affix my signature in presence of two witnesses.

ROGER S. PEASE.

Witnesses:
C. M. CLARKE,
CHAS. S. LEPLEY.